March 11, 1930.    H. L. THOMPSON    1,750,140
ANTIFRICTION BEARING
Filed Dec. 31, 1927
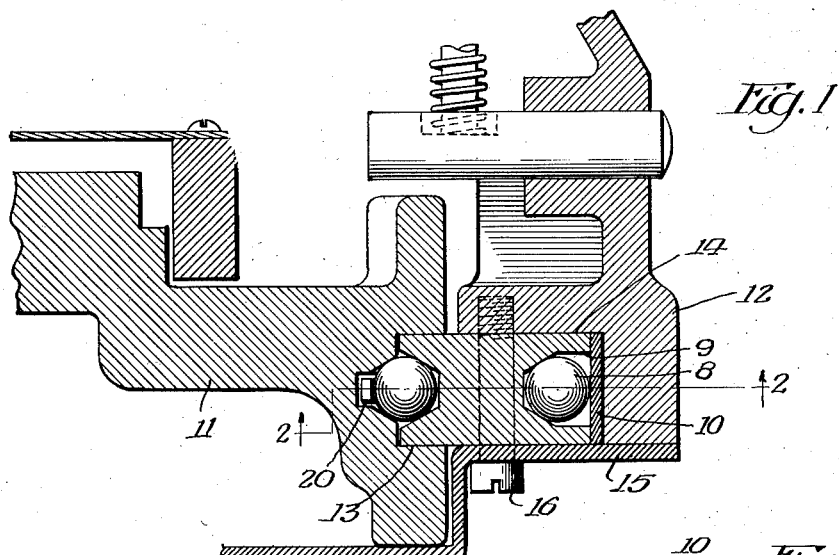
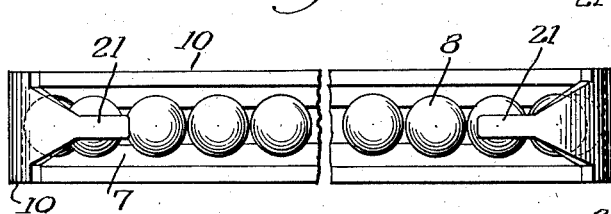
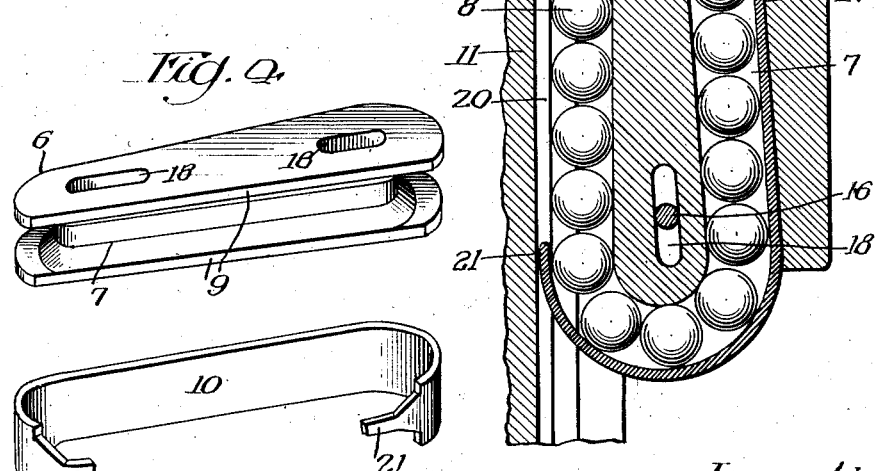

Patented Mar. 11, 1930

1,750,140

UNITED STATES PATENT OFFICE

HERBERT L. THOMPSON, OF ELGIN, ILLINOIS, ASSIGNOR TO ADDRESSOGRAPH COMPANY, OF CHICAGO, ILLINOIS, A CORPORATION OF DELAWARE

ANTIFRICTION BEARING

Application filed December 31, 1927. Serial No. 243,868.

This invention relates to antifriction bearings and its object is to provide a ball bearing of simple and novel construction adapted to be interposed between two parts to enable one part to move easily and quietly on the other part.

Another object is to provide a wedge shaped ball bearing adapted to be easily and accurately adjusted between two parts, one of which is movable relative to the other part, to prevent lateral thrust of the movable part and to maintain said movable part in proper relation to the other part while permitting free and quiet movement thereof.

The invention is capable of use and adaptation for use in many different machines and it is especially useful in a printing machine of the kind disclosed in the application of Henry E. Hubbard, Cecil C. McCain and myself, Serial No. 211,967, filed August 10, 1927, in which it is shown.

In the accompanying drawings illustrating a selected embodiment of the invention, Fig. 1 is a sectional view showing the invention applied to a printing machine between the movable carriage and the frame upon which it travels.

Fig. 2 is a horizontal sectional view on the line 2—2 of Fig. 1.

Fig. 3 is a side elevation of the bearing.

Fig. 4 is a detail perspective view of the body of the bearing.

Fig. 5 is a perspective view of the retainer shield.

Referring to the drawings 6 is the body of the bearing, preferably made of a single block of metal and provided with a race 7 to receive the balls 8. The body is elongated and tapered from end to end to make it wedge shape. The top and bottom walls of the ball race are cut away on one side, at 9—9, from end to end of the body so that the balls will project beyond said walls, but on the other side of the body and at the ends of the body the walls preferably project substantially the width of the balls, as clearly shown in Fig. 2. A retainer strip or shield 10 is bent around the ends and the outer side of the body to retain the balls in the race, but the ends of the retainer terminate with the bends thereof at the ends of the bearing so that the balls traveling in a straight line on the inner side of the bearing will be free from and unrestrained by the retainer.

The bearing is shown interposed between a fixed frame 11 and a movable carriage 12, the frame having a guide groove 13 therein in which the bearing slides and the carriage having a recess 14 therein in which the bearing is secured by a plate 15 and screw bolts 16. The wall 17 of the recess is inclined and the body is provided with slots 18 to receive the screw bolts 16 whereby the bearing may be easily and accurately adjusted in proper position between the fixed part and the movable part to provide for simple and easy and quiet operation of the movable part without binding or seizing in the groove. The back wall of the groove 13 in the fixed part is provided with a slot 20 to accommodate the reduced ends 21 of the retainer 10 so that the balls between said retainer ends may contact directly with the back wall of the groove, as shown in Figs. 1 and 2.

The invention is simple in construction, it comprises only two essential parts, the body and the retainer, and it is adapted to be easily assembled and arranged in operative position. The retainer is freely and detachably engaged with the body and is held in place thereon to retain the balls when it is installed in operative position. The wedge shape construction is desirable because it enables an accurate adjustment and a long engagement between the bearing and the wall of the movable member in which it is secured. The bearing provides for smooth, easy and quiet operation of the movable part on and relative to the fixed part and with such neat and accurate adjustment of parts that the movable part is maintained in proper relation to the fixed part and lateral thrust thereof is prevented.

I claim:

1. An antifriction bearing comprising an elongated wedge shaped body having a peripherally open ball race thereabout, a plurality of balls in the race, and a retainer on the body for holding the balls in a part of said race.

2. An antifriction bearing comprising an elongated body having a peripherally open ball race thereabout, a plurality of balls arranged in the race, and a retainer having curved ends freely and detachably fitted on the body for holding the balls in the back and ends of the ball race.

3. An antifriction bearing comprising an elongated wedge shaped body having a peripherally open ball race thereabout, a plurality of balls in the race, and a retainer for holding the balls in a part of said race, said body having slots therein, and means engaging said slots for adjusting the position of the bearing.

4. The combination of a rigid member having a guide groove therein, a movable member having a recess, an antifriction bearing secured in said recess and operating in said groove, said groove having a slot in its back wall, and a retainer on the body for holding the balls in a part of the race, said retainer having its ends terminating adjacent the ends of the bearing on the inner side thereof and positioned in said slot.

5. The combination of a rigid member having a guide groove therein and a movable member having a recess therein, the inner wall of said recess being inclined longitudinally and relatively to the back wall of said groove, and a wedge shaped bearing secured in said recess and operating in said groove, said groove comprising a body having a ball race thereabout, a plurality of balls in the race, and a retainer for holding the balls in the outer part and the ends of the race, the remaining balls engaging the back wall of said groove.

HERBERT L. THOMPSON.